(12) United States Patent
Vizi et al.

(10) Patent No.: US 9,030,547 B2
(45) Date of Patent: May 12, 2015

(54) METHOD AND MEASURING SYSTEM FOR SCANNING MULTIPLE REGIONS OF INTEREST

(75) Inventors: E. Szilveszter Vizi, Budapest (HU); Gergely Katona, Budapest (HU); J. Balazs Rozsa, Budapest (HU); Attila Kaszas, Szeged (HU); Gergely Turi, Budapest (HU)

(73) Assignee: Femtonics Kft., Budapest (HU)

( * ) Notice: Subject to any disclaimer, the term of this patent is extended or adjusted under 35 U.S.C. 154(b) by 1008 days.

(21) Appl. No.: 12/998,668

(22) PCT Filed: Nov. 17, 2009

(86) PCT No.: PCT/HU2009/000094
§ 371 (c)(1),
(2), (4) Date: Jul. 27, 2011

(87) PCT Pub. No.: WO2010/055361
PCT Pub. Date: May 20, 2010

(65) Prior Publication Data
US 2011/0279667 A1    Nov. 17, 2011

(30) Foreign Application Priority Data

Nov. 17, 2008  (HU) ...................................... 0800688
Dec. 31, 2008  (EP) ...................................... 08462011

(51) Int. Cl.
*H04N 7/18* (2006.01)
*G02B 21/06* (2006.01)
*G02B 21/36* (2006.01)
*G02B 26/10* (2006.01)
*G02B 21/00* (2006.01)

(52) U.S. Cl.
CPC .......... *G02B 21/0036* (2013.01); *G02B 21/365* (2013.01); *G02B 26/101* (2013.01); *G02B 26/105* (2013.01)

(58) Field of Classification Search
CPC ............. G02B 21/0036; G02B 21/365; G02B 26/101; G02B 26/105
See application file for complete search history.

(56) References Cited

U.S. PATENT DOCUMENTS 6,181,422 B1 * 1/2001 Veltze ........................... 356/600
8,159,744 B2 * 4/2012 Tsurumune ................... 359/385
(Continued)

OTHER PUBLICATIONS

Lorincz et al, Differential Distribution of NCX1 contributes to spine-dendrite compartmentalization in CA1 pyramidal cells, Jan. 16, 2007, The National Academy of Sciences of the USA, vol. 104, No. 3, pp. 1033-1038.*

*Primary Examiner* — Chistopher S Kelley
*Assistant Examiner* — Asmamaw G Tarko
(74) *Attorney, Agent, or Firm* — Olson & Cepuritis, Ltd.

(57) ABSTRACT

The invention relates to a method for carrying out measurements on at least one region of interest within a sample via a laser scanning microscope having focusing means for focusing a laser beam and having electro-mechano-optic deflector for deflecting the laser beam, the method comprising: providing a scanning trajectory for the at least one region of interest; providing a sequence of measurements and the corresponding scanning trajectories; providing cross-over trajectories between the scanning trajectories of two consecutive measurements; deflecting the laser beam via the electro-mechano-optic means for moving a focus spot of the focused laser beam along a scanning trajectory at an average scanning speed; and deflecting the laser beam via the electro-mechano-optic means for moving the focus spot of the laser beam along a cross-over trajectory at a cross-over speed having a maximum, the maximum of the cross-over speed being higher than the average scanning speed. The invention further relates to a measuring system for implementing the method according to the invention

11 Claims, 10 Drawing Sheets

(56) References Cited

U.S. PATENT DOCUMENTS

| | | | |
|---|---|---|---|
| 2004/0101210 A1* | 5/2004 | Weinstein et al. | 382/284 |
| 2006/0045388 A1* | 3/2006 | Zeineh et al. | 382/312 |
| 2009/0220256 A1* | 9/2009 | Suhara et al. | 399/32 |
| 2010/0046824 A1* | 2/2010 | Dutta-Choudhury | 382/133 |

* cited by examiner

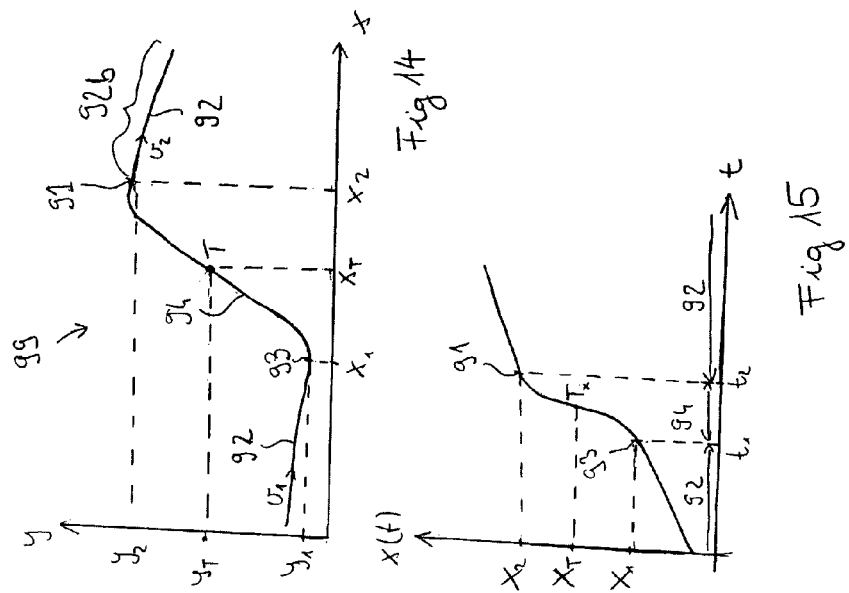
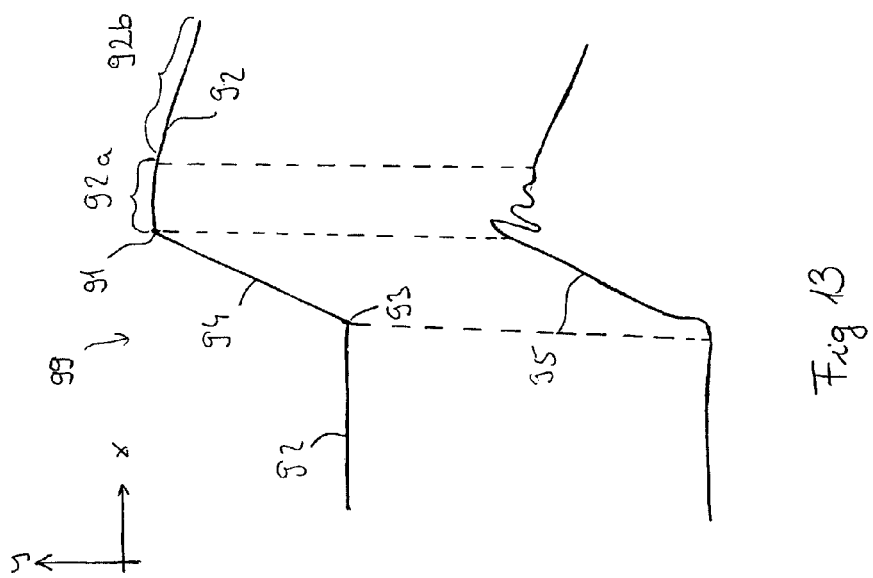

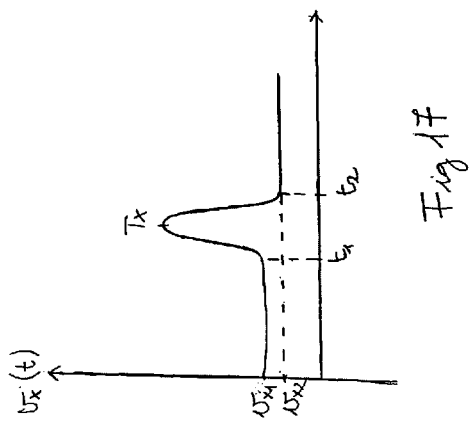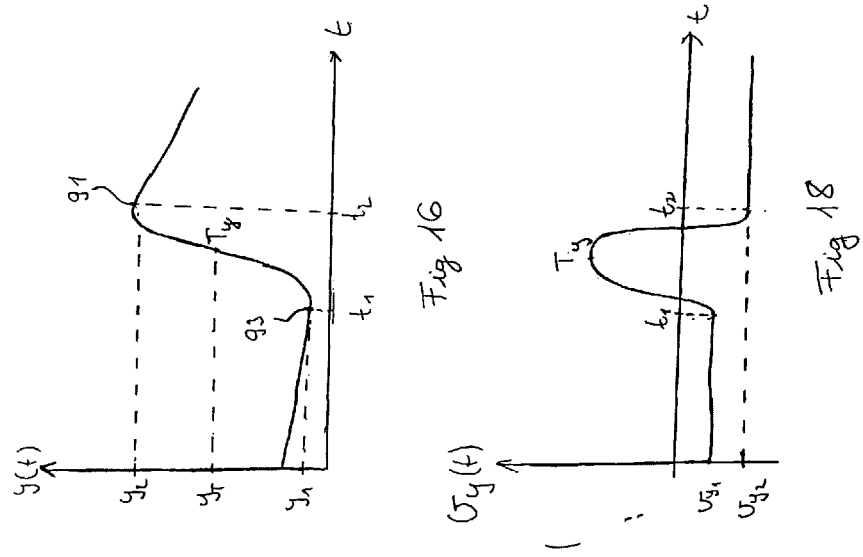

METHOD AND MEASURING SYSTEM FOR SCANNING MULTIPLE REGIONS OF INTEREST

The present invention relates to a method for carrying out measurements on at least one but preferably multiple regions of interest within a sample via a laser scanning microscope having focusing means for focusing a laser beam and having electro-mechano-optic deflector for deflecting the laser beam.

The invention further relates to a measuring system for realising the inventive method.

Two-dimensional (2D) and three-dimensional (3D) laser scanning technologies have great importance in performing measurements on biological specimens (including scanning, imaging, detection, excitation, etc.) e.g. imaging biological structures or mapping fluorescent markers of cell surface receptors or performing measurements such as uncaging, photo-stimulation, FRET (Fluorescence resonance energy transfer), FLIM (Fluorescence lifetime imaging), etc.

The present invention relates to, but is not limited to two-photon (or multi-photon) laser scanning microscope technology, e.g. the present invention may be implemented on a one-photon laser scanning microscope or on a confocal laser scanning microscope.

When applying either 2D or 3D scanning technologies scanning of a sample may be performed by moving the sample stage e.g. via stepping motors, or by changing the position of the focal spot of a laser beam traversing the microscope optics relative to the sample. The first solution—i.e. moving the sample stage—is complicated to implement when using submerge specimen chambers or when electrical recording is performed on the biological specimen with microelectrodes. Accordingly, in the case of measuring biological specimens it is often preferred to move the focus spot of the laser beam instead of moving the specimen. This can be achieved by deflecting the laser beam to scan different points within a given focal plane (XY plane) and—in case of 3D microscopy—by displacing the objective along its optical axis (Z axis), e.g. via a piezo-positioner, or by using acousto-optic deflectors to change the depth of the scanned focal plane. Several known electro-mechano-optic technologies exist for deflecting the laser beam in an XY plane, e.g. via deflecting mirrors mounted on galvanometric scanners.

As indicated above, when performing certain types of biological measurements very often only a fraction of the whole specimen is of interest. For example, when measuring neural processes typically only a few dendrites, axons, spines or the like are under examination and any additional scanning data obtained from the rest of the biological tissue does not contribute to the actual measurement. In order to enhance the efficiency of the measurement prior art laser scanning technologies aim at reducing the area (or volume) of the superfluous regions which are inevitably scanned together with the regions of interest (single points, straight or curved lines, areas, volumes of interest). Using prior art raster scanning technologies this can be achieved by selecting a minimal raster scan area (or volume) containing all the regions of interest. The whole of the minimal raster scan area (or volume) is scanned and superfluous data obtained from regions not belonging to the regions of interest are disregarded.

A more efficient scanning method can be performed by random access laser scanning microscopes, which allow for scanning along random trajectories. In this case the prior art solutions propose connecting all the regions of interest by a single trajectory and scanning along this trajectory, thereby the superfluous regions are limited to the lines connecting the regions of interest. However, even this method is rather time consuming as relatively long time is spent scanning along the lines connecting the actual regions of interest. The method is even less efficient if the regions of interest are not coplanar and depth focusing has to be performed as well.

It is an object of the invention to overcome the problems associated with the prior art laser scanning microscopes. In particular, it is an object of the invention to further enhance the prior art scanning technologies by providing a method and system for reducing the scanning time spent on other parts of a specimen than the regions of interest. Obviously, when more time is spent scanning a region of interest, more data is collected therefrom, thus higher temporal resolution of the signals can be resolved, and better signal-to-noise ratio can be achieved by averaging. Moreover, longer measurement time allows for reducing measurement influences that could harm or alter the biological samples e.g. by lowering the laser intensity or lowering the dye concentration filling the cells.

It is a further object of the present invention to combine the inventive scanning technology with existing 2D and 3D laser scanning technologies, for the purpose of reducing the overall scanning time needed for scanning regions of interest in 2D or 3D respectively.

The above objects are achieved by a method for carrying out measurements on at least one region of interest within a sample via a laser scanning microscope having focusing means for focusing a laser beam and having electro-mechano-optic deflector for deflecting the laser beam, the method comprising:
  providing a scanning trajectory for the at least one region of interest;
  providing a sequence of measurements and the corresponding scanning trajectories;
  providing cross-over trajectories between the scanning trajectories of two consecutive measurements;
  deflecting the laser beam via the electro-mechano-optic means for moving a focus spot of the focused laser beam along a scanning trajectory at an average scanning speed; and
  deflecting the laser beam via the electro-mechano-optic means for moving the focus spot of the laser beam along a cross-over trajectory at a cross-over speed having a maximum, the maximum of the cross-over speed being higher than the average scanning speed.

In the context of the present invention regions of interests are understood to comprise points of interest, straight or curved lines of interest as well as areas and volumes of interest.

The invention further relates to a measuring system for carrying out measurements on at least one region of interest within a sample via a laser scanning microscope having focusing means for focusing a laser beam and having electro-mechano-optic deflector for deflecting the laser beam, the system comprising:
  means for selecting at least one region of interest within the sample;
  means for providing a scanning trajectory for the at least one region of interest;
  means for providing a sequence of measurements and the corresponding scanning trajectories;
  means for providing cross-over trajectories between the scanning trajectories of two consecutive measurements;
  control means being configured to control the electro-mechano-optic means so as to
    deflect the laser beam for moving a focus spot of the focused laser beam along a scanning trajectory at an average scanning speed; and deflect the laser beam for moving the focus spot of the laser beam along a cross-over trajectory at a cross-over speed having a maximum, the maximum of the cross-over speed being higher than the average scanning speed.

Further advantageous embodiments of the invention are defined in the attached dependent claims.

Further details of the invention will be apparent from the accompanying figures and exemplary embodiments.

FIG. 13 is a schematic drawing showing a composite trajectory comprising a first and a second scanning trajectory and a cross-over trajectory connecting the two, and showing the actual trajectory of a scanning focus spot directed along the composite trajectory.

FIG. 14 is a schematic drawing showing another composite trajectory according to another aspect of the invention.

FIG. 15 is a diagram illustrating the X position of the scanning focus spot as a function of time when the focus spot is moved along the composite trajectory of FIG. 14.

FIG. 16 is a diagram illustrating the Y position of the scanning focus spot as a function of time when the focus spot is moved along the composite trajectory of FIG. 14.

FIG. 17 is a diagram illustrating the X component of the speed of the scanning focus spot as a function of time when the focus spot is moved along the composite trajectory of FIG. 14.

FIG. 18 is a diagram illustrating the Y component of the speed of the scanning focus spot as a function of time when the focus spot is moved along the composite trajectory of FIG. 14.

Figure 1:
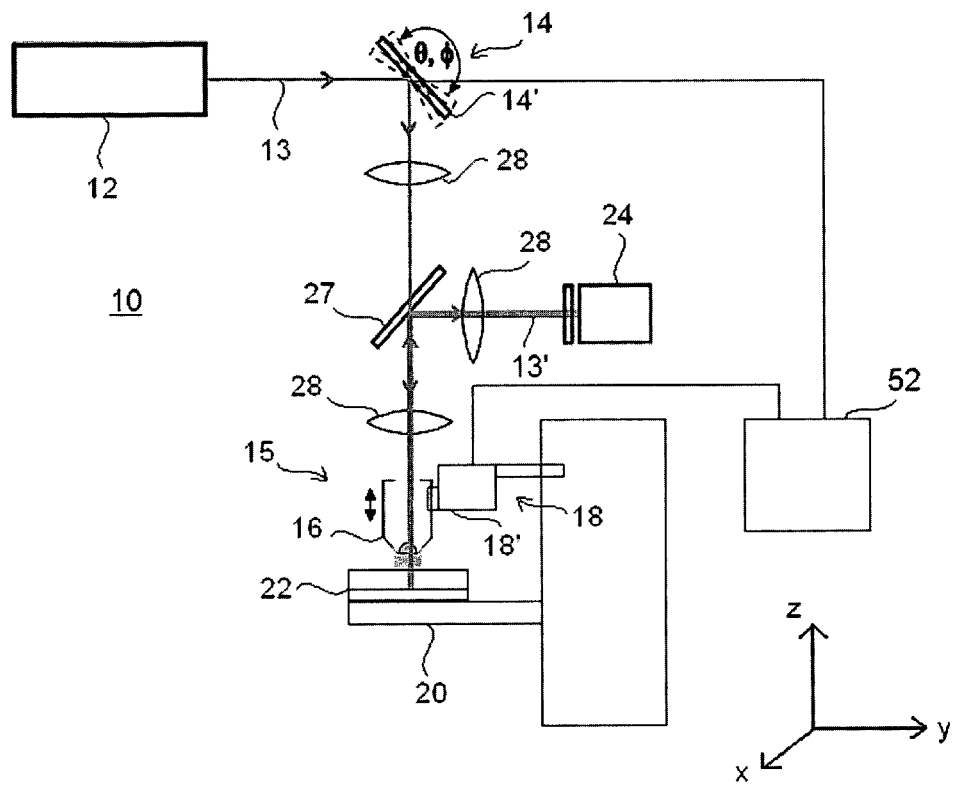
FIG. 1 is a schematic diagram of an exemplary laser scanning microscope that can be used in combination with the inventive system and the inventive method.

FIG. 1 is a schematic diagram illustrating an embodiment of a laser scanning microscope 10 which can be used in combination with the inventive system and which is suitable for implementing the inventive method. The microscope 10 comprises a laser source 12 providing a laser beam 13; beam deflector 14 for deflecting the laser beam 13 in X and Y directions; focusing means 15, in this case a microscope objective 16; drive means 18 for displacing the objective 16 along the optical axis (Z direction) of the objective 16; a sample stage 20 for holding or supporting a sample 22 (e.g. a biological specimen 22') under the objective 16; and a detector 24.

In the context of the present invention XY plane are understood to mean the plane perpendicular to the optical axis (Z axis) of the microscope 10, and X and Y directions are understood to mean two perpendicular axes lying in the XY plane. Furthermore, it should be noted that the optical axis (corresponding to the Z direction) is not necessarily vertical, e.g. the optical axis of a microscope XY suitable for measuring thin tissue slices attached to a sample slide may lie at any desired angle to the vertical direction. Also, although the illustrated embodiment represents an upright microscope, it will be apparent to the skilled person that an invert microscope could be applied as well.

A dichroic mirror 26 is arranged along the optical path of the laser beam 13 to separate the laser beam 13 provided by the laser source 12 from the reflected beam 13' reflected from the sample or back fluoresced light beam 13' emitted by the sample, e.g. the fluorescence photons emitted by excited fluorophores within the sample 22 under examination. Any suitable detector 24 can be used, e.g. a photo multiplier, to detect the emitted or reflected photons. Also, more than one detectors 24 provided with appropriate wavelength filters may be arranged in a known way if emitted photons of different wavelengths are to be detected separately.

The deflector 14 can be any suitable electro-mechano-optic beam deflecting device, such as galvanometric scanning mirrors 14' (mirrors mounted on galvanometric scanners configured to deflect the laser beam 13 in X and Y directions for scanning within a given XY focal plane).

Additional optical guide means such as lenses 28 or mirrors (e.g. spherical mirrors guiding the laser beam 13 onto and between the scanning mirrors 14') can be provided to create a desired optical path and to hinder divergence of the laser beam 13.

The microscope objective 16 of the illustrated microscope 10 is mounted on the objective drive means 18, which is preferably a piezo positioner 18' capable of providing very fast micro- or nano-scale displacements, but optionally other types of suitable devices and opto-mechanical solution can be used as well to modify the position of the focal plane within the sample, e.g. electromagnetic positioning of the optical parts, mechanical step motor drives, resonant driving of optical elements mounted on springs, or a modified imaging system objective can be used, wherein only one small lens is moved within the objective, whereby the working distance of the objective (i.e. the position of the focal plane) can be changed without having to move the whole mass of the objective.

Furthermore focusing along the Z direction can be achieved in any other known way as well, e.g. acousto-optic deflectors may be used, or the sample stage 20 might be mounted on a mechanical step motor drive and may be displaced relative to the microscope objective 16 (if the nature of the sample 22 does not require that the sample 22 be kept inert).

Advantageously, scanning at various focal depths may be achieved using the known two-photon laser excitation technology, however, any other known technology might be used as well, e.g. confocal microscope technology, could be applied in connection with the present invention. Furthermore, the invention can be applied with conventional 2D scanning technologies, wherein scanning is in one XY plane of a sample 22.

A two-photon laser scanning microscope 10 uses laser light of lower energy of which two photons are needed to excite a fluorophore in a quantum event, resulting in the emission of a fluorescence photon, which is then detected by the detector 24.

The probability of a near simultaneous absorption of two photons is extremely low requiring a high flux of excitation photons, thus two-photon excitation practically only occurs in the focus spot of the laser beam, i.e. a small ellipsoidal volume having typically a size of approximately 300 nm×300 nm×1000 nm.

For the purpose of two-photon laser excitation the laser source 12 can be a femtosecond impulse laser, e.g. a Mode-locked Ti-sapphire laser providing the laser beam 13 having the required photon flux for the two-photon excitation, while keeping the average laser beam intensity sufficiently low. Accordingly the laser beam 13 may be made up of discrete laser impulses of MHz repetition rate and femtosecond impulse width.

Figure 2:
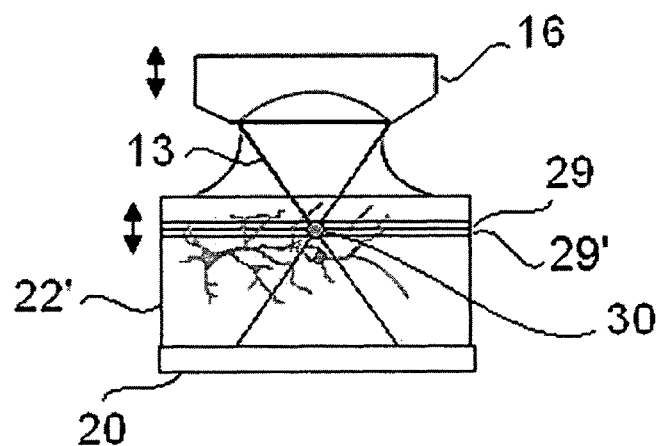
FIG. 2 is an enlarged view of a sample under the objective of the microscope illustrated in FIG. 1.

As illustrated in FIG. 2 when depth focusing is performed e.g. by displacing the objective 16 along its optical axis (i.e. in the Z direction) the focal plane 29 of the objective 16 is shifted relative to the sample 22 (depicted as a biological specimen 22' of a neural tissue), thus the focus spot 30 (i.e. the focal volume of the focused laser beam 13) can be moved in the Z direction.

Figure 3:
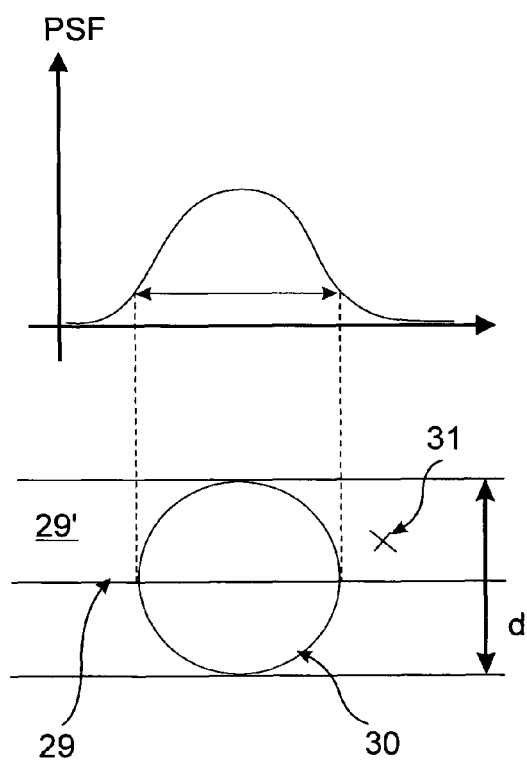
FIG. 3 is a schematic illustration of a focus spot and its point spread function (PSF).

The size and shape of the focus spot 30 depends on the microscope optics, and in particular on the focusing means (e.g. the microscope objective 16 or acousto-optic deflectors); and can be best described by its point spread function (PSF) depicted in FIG. 3. Because the focus spot 30 has a certain diameter d various types of measurements may be performed even if a measuring point 31 is offset from the theoretical focal plane 29. When moving the focus spot 30 in the focal plane 29 the focus spot 30 sweeps an effective focal layer 29' of a certain width d corresponding to the diameter of the effective focus spot, i.e. the focus spot 30 sweeps a quasi planar layer within which measuring points 31 may be excited by the laser beam 13. The width d of the effective focal layer 29' depends on factors such as the type of measurement to be performed, the intensity of the laser beam 13, the sample 22, the quantity and quality of any fluorophore markers, etc.

It is generally recognised that the full width at half maximum (FWHM) of the PSF can be regarded as the effective diameter of the focus spot 30 within which measuring points 31 can be detected. However, it has been found certain neural process measurements can be carried out even where the PSF is below the half maximum, thus within a greater effective diameter of the focus spot 30, and this may further be enhanced by normalising the measurement data in accordance with the invention. Thereby measuring points 31 falling within a focal layer 29' having an effective width of 6 to 7 µm may be scanned without having to change the objective-sample distance (or without having to change the focal plane 29 of the acousto-optic deflectors, where such devices are used for performing depth focusing).

Figure 4:
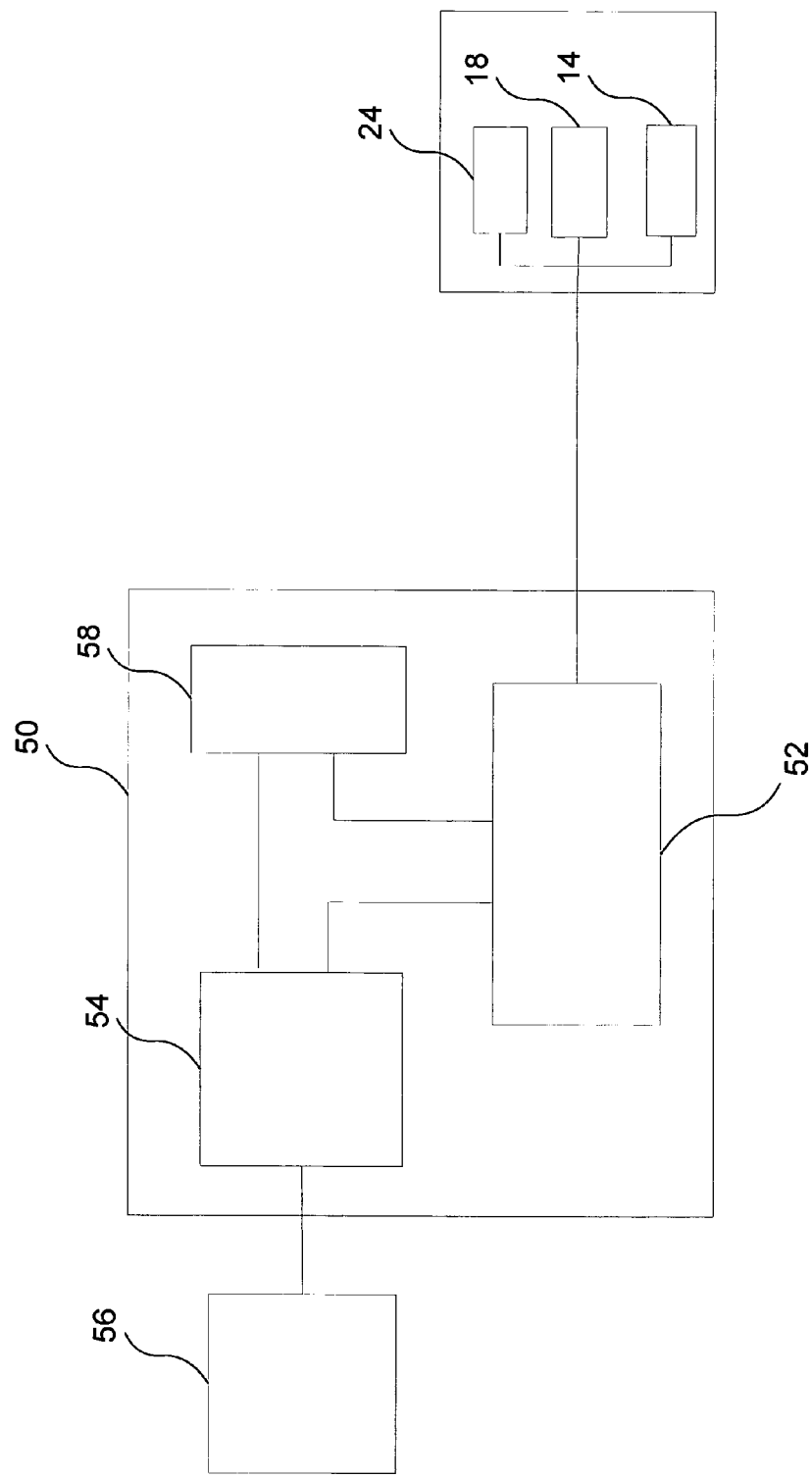
FIG. 4 is a block diagram of a preferred embodiment of the inventive measuring system.

An exemplary measuring system 50 according to the invention is illustrated in the block diagram of FIG. 4. The measuring system 50 comprises control means 52 (also indicated in FIG. 1) for controlling the beam deflector 14 and the drive means 18 of the objective 16 (or any other device serving to change the focus position relative to the sample 22 along the optical axis of the microscope 10). The control means 52 can be a device such as a computer or a microcontroller or a software application installed on a computer or a computer program on a computer readable media. The control means 52 may provide drive signals directly to the deflector 14 and the objective drive means 18, or alternatively the control means 52 may serve to control a plurality of control units separately controlling components of the microscope 10, such as the objective drive means 18 and the deflector 14. The control means 52 is preferably configured to obtain data from the separate control units (such as measurement data from the detector 24; position feedback information from the deflector 14 and the drive means 18) and for processing such data and for sending back control signals to the control units based on the results of the processing.

The measuring system 50 preferably further comprises at least one data output interface 54, which may be a visual display of a software application that can be displayed on information presentation means 56 such even a holographic or stereoscopic device as a monitor, display, printer or the like. Alternatively the data output interface 54 may itself comprise such information presentation means or the like.

The measuring system 50 preferably further comprises at least one data input interface 58, which may be a user interface allowing the user to input data, or it may serve for other software applications for inputting data to be used by the control system 52 or to be displayed by the data output interface. Furthermore the data input interface 58 may be a physical interface such as a keyboard, mouse, touch screen, etc., or it may be a software interface, e.g. an active field in a graphical interface where data may be inputted.

The data output interface 54 and the data input interface 58 may form a single interface means, e.g. a touch screen may be provided as data input interface 58 for inputting measurement commands, and at the same time serve as the data output interface 54, displaying e.g. measurement data. Similarly a software may provide a graphical display area for presenting data as well as for inputting data e.g. via active data input fields.

In the case of measuring neural processes the regions of interest correspond typically to axons or dendrite portions or spines falling within a single focal layer 29', thus very often it is sufficient to perform the measurements at a given objective position (or focal plane position, should depth focusing be performed in any other way than displacing the objective 16 and/or sample 22 relative to each other, e.g. by changing the settings of acousto-optic deflectors). Hence in a first example the method and measuring system 50 according to the invention is described in connection with a biological specimen 22' of neural processes, wherein the regions of interest lie substantially in a common focal layer, thus without involving any depth scanning apart from initially setting the focal plane 29 to a height at which the focal layer 29' comprises the regions of interest.

Preferably a background image 80 (FIG. 5) of the biological specimen 22' is obtained by any conventional imaging technique. As can be seen the background image 80 comprises a dendrite portion 82 and dendritic spines 84. Regions of interest 86 may be selected e.g. by a user via the data input interface 58 or e.g. via an external or an internal image processing application automatically identifying the dendrites 82 and spines 84 within the background image 80.

Such an external image processing application may use the data output interface 54 to obtain background image 80 data and may use the data input interface for returning the data of the calculated regions of interest 86 (e.g. dendrites 82 and spines 84).

Figure 5A:
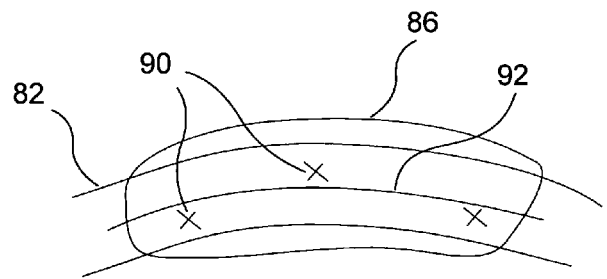
FIG. 5a is a schematic illustration of how a region of interest and/or a scanning trajectory may be defined along a neural process.

In a preferred embodiment the background image 80 is graphically displayed by the data output interface 54 and the user may chose the regions of interest 86 and/or a scanning trajectory 92 by selecting discrete guide points 90 along the regions to be measured, e.g. along the dendrite portion 82 as illustrated in FIG. 5a. A scanning trajectory 92 is calculated for scanning the regions of interest 86 defined by the selected guide points 90. The scanning trajectory 92 may be calculated by the control means 52 of the measuring system 50 or by external calculating means (not depicted) using any suitable interpolation algorithm. The calculated scanning trajectory 92 may lie outside of the defined region of interest 86 and yet allow for measuring the region of interest 86 by making use of the volumetric dimension of the focus spot 30. This may be necessary when other boundary conditions need to be met as well, e.g. when performing 3D scanning using a periodically oscillated objective 16 as will be explained later on. Advantageously the measuring system 50 is configured to take the physical properties of the scanner motors of the electro-mechano-optic deflector 14 and the provided measurement particulars (such as the desired scanning speed, the spatial position of the selected guide points 90, etc.) into account in the interpolation algorithm, in order not to exceed the maximum speed and maximum acceleration of the scanner motors. The interpolation may be based on solving the differential equation of the motion of the scanner motors or at least on modelling the scanner motors' motion. If the maximum speed and acceleration of the motors are not exceeded the scanning trajectory 92 may be scanned repetitively without any substantial deviation between each scan.

In a preferred embodiment the user may change or delete each selected guide point 90 via the data input interface 58 in order to influence the interpolated scanning trajectory 92.

It is also possible to allow the user to draw the scanning trajectory 92 manually, and optionally to configure the control means 52 to smoothen the user scanning trajectory 92 in order to obtain a scanning trajectory 92 free of any sharp turns or abrupt change in the scanning speed or direction.

Figure 5:
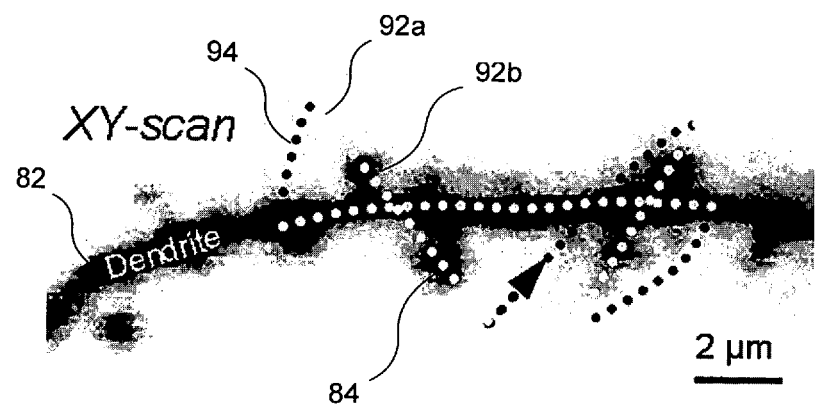
FIG. 5 is an illustration of a background image obtained from a biological specimen, wherein regions of interest and a composite trajectory comprising scanning trajectories and cross-over trajectories are indicated.

The defined scanning trajectory 92 may be contained entirely within the region of interest 86 or it may extend outside the region of interest 86 as can be seen in FIG. 5, wherein transient portion 92a of the scanning trajectories 92 extend beyond the actual measuring portion 92b of the scanning trajectory 92 provided for scanning the regions of interest 86. The function of the transient portion 92a will be explained in more detail later on. The transient portions 92a may be set manually by the user via the data input interface 58 or they may be calculated by the measuring system 50, in particular by the control means 52.

Similarly the measurements to be performed on the regions of interest 86 may be provided by a user via the data input interface 58, or the measurements may be specified by an internal or external program. Exemplary measurements may include activation of photo-sensitive molecules such as uncaging, photo-stimulation, FRET (Fluorescence resonance energy transfer), FRAP (Fluorescence recovery after photobleaching), or measurements such as SHG (Second harmonic generation), or OCT (Optical coherent tomography), FLIM (Fluorescence lifetime imaging), STED (Stimulated Emission Depletion), etc.

Figure 6:
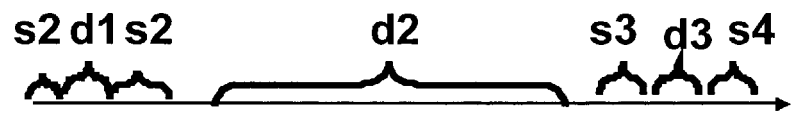
FIG. 6 is a schematic diagram illustrating the sequence of the regions of interest to be measured.

Once the measurements and the regions of interest 86 are specified the sequence of the measurements may be provided by the user or by an internal or external program, or it may be calculated by the measuring system 50. For example, if the user only specifies the region of interest 86 (e.g. via selecting guide points 90), the type or types of measurements to be performed, and a repetition number for repeating the measurements, in this case the measuring system 50 (e.g. via the control means 52) may calculate an optimal sequence of the measurements together with corresponding scanning trajectories 92 taking into account the physical properties, such as the inertia, maximum speed and acceleration of the scanning motors of the deflector 14. An exemplary measurement sequence for the regions of interest 86 illustrated in FIG. 5 is defined in FIG. 6. The measurement sequence comprises repeated series of the same measurement sub-sequence, wherein first the two right-hand side spines s1 and s2 are measured with the dendrite section d1 interposed between the two spines s1, s2; then the longitudinal dendrite portion d2 is measured, and finally the two left-hand side spines s3 and s4 with the interposed dendrite section d3. The focus spot 30 of the laser beam 13 is directed from one scanning trajectory 92 to the consecutive scanning trajectory 92 over a cross-over trajectory 94. The shape and particulars of the cross-over trajectory 94 will be explained later on. Measurement may or may not be performed along the cross-over trajectory 94. In the present example measurement data is obtained from the cross-over trajectory 94 as well, thus the whole of a composite trajectory 99 comprising the scanning trajectories 92 and the cross-over trajectories 94 is measured.

When there is no biologically relevant structure along the cross-over trajectory 94 or no relevant information to collect, obtaining measurement data along the cross-over trajectory 94 has no influence on the actual measurement to be performed on the regions of interest 86. However, should the regions of interest 86 lie more spaced apart with biologically relevant structures interposed between them it might be preferred to switch off the scanning laser beam 13 while crossing over such biologically relevant structures along the cross-over trajectory 94. The scanning beam 13 may be switched off via any sufficiently fast shutter device, or the laser illumination may be switched off temporarily using a sufficiently fast intensity modulator e.g. a Pockels-cell.

In the context of the present invention directing or moving the focus spot 30 is understood to comprise directing or moving a virtual focus spot as well. As the position of the focus spot 30 is determined by the settings of the microscope 10 (e.g. position of the scanning mirrors 14' and objective 16 or frequency settings of acousto-optic focusing means), directing or moving the focus spot 30 (or a virtual focus spot) amounts to changing the settings of the microscope 10 in a way that would bring the focus spot 30 of a laser beam 13 traversing the microscope optics to the desired new position. Accordingly, the meaning of the term cross-over trajectory 94 comprises the possibility of a virtual trajectory as well along which the virtual focus spot would be moving had the laser beam 13 not been switched-off.

Furthermore, in the context of the present invention directing or moving the focus spot 30 is understood to comprise controlling an electro-mechano-optic deflector 14 such that a laser beam 13 traversing the deflector 14 would be deflected relative to the optical axis of the microscope 10, even if the state of other components of the microscope 10 do not allow for the actual focusing of the laser beam 13, hence no focus spot 30 would be produced even if the laser beam 13 would be allowed to pass. For example when using acousto-optic focusing means for performing depth focusing (i.e. for changing the focal plane 29) the laser beam 13 might be spatially scattered while changing between two focal plane positions. However even in this situation the state of the deflector 14, e.g. the position of the scanning mirrors 14' within the deflector 14 allow for determining a virtual trajectory projected onto an XY plane perpendicular to the optical axis of the microscope 10.

The above sub-sequence of measurements (here including measurement data obtained along the cross-over trajectories 94 as well) is repeated for a given repetition number.

Biological measurements of neural processes typically include some kind of chemical, electrical, electro-chemical or photo stimulation, wherein one or more dendritic spines 84 or the dendrite portion 82 is stimulated using known technologies such as stimulation by electrodes or administering of chemical substances (e.g. via a micropipette), or uncaging via photo-stimulation by the laser beam 13 of the microscope 10.

Figure 7:
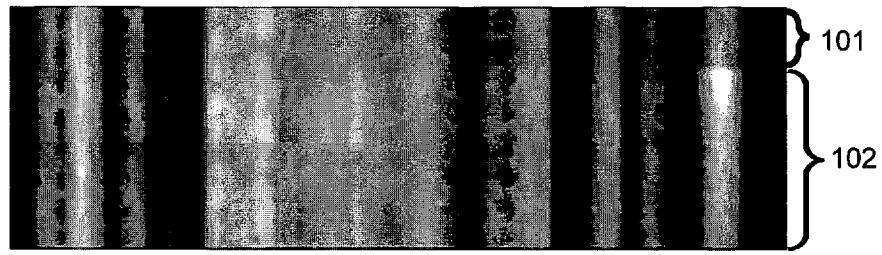
FIG. 7 is a diagram presenting measurement data obtained along the trajectory defined in FIG. 5.

The measurement data diagram of FIG. 7 illustrates such an exemplary measurement series wherein a first sequence of measurements 101 (comprising the above given sub-sequence repeated over a number of periods) is performed before applying stimulation to the biological specimen 22' and the second sequence of measurements (comprising the sub-sequence depicted in FIG. 6 repeated over a number of periods) was performed after the stimulation of the biological specimen 22'. Optionally the second sequence of measurements may include the stimulation of the biological specimen 22', e.g. when performing stimulations such as uncaging via the laser beam 13. The intensity of the reflected light or back fluoresced light measured by the detector 24 is represented as lighter and darker shade areas of the diagram (lighter shades corresponding to stronger detected signal). Each single sub-sequence of measurements (s1-d1-s2-d2-s3-d3-s4 and the cross-over sections 94 there between) is represented as a thin horizontal band, the measurement data of the repeated sub-sequences of measurements are tiled vertically in the order of measurements thereby producing the rectangular measurement data diagram of FIG. 7. Thus sub-sequences of measurements belonging to the first sequence of measurements 101 form the upper rectangular area of the diagram, while sub-sequences of measurements belonging to the second sequence of measurements 102 (including stimulation or after stimulation) form the lower rectangular area of the diagram.

As can be seen in FIG. 7 the response function is hard to decipher from the direct measurement data diagram shown in FIG. 7. This is because the scanning trajectory 92 has been defined in a single scanning plane (practically the XY plane of the background image 80, which is also the focal plane 29 used for scanning the scanning trajectory 92, which is defined within the XY plane of the background image 80), however the dendritic portion 82 and the measured spines 84 are 3D structures, which are only quasi planar. Hence, the selected dendrite portion 82 and the spines 84 can only be regarded as lying more or less in the XY plane. When scanning along the scanning trajectory 92 the intensity of the measured reflected light or back fluoresced light depends on the actual portion of the 3D neural structure that is scanned by the focus spot 30 having an effective diameter d. As explained above, the dendrite portion 82 or the spines 84 may be at varying height with respect to the focal plane 29, nevertheless scanning of such quasi planar structures is rendered possible by the fact that the focused scanning beam 13 takes the shape of a spot 30 (focal volume) rather than a point-like focus point. The focus spot 30 has an effective diameter d (see the PSF in FIG. 3) within which the intensity of the focused laser light is sufficiently high for performing the measurement (e.g. for generating sufficient amount of back fluoresced light to be detected by the detector 24). However, because some portions of the measured dendrites 82 and spines 84 are more distant from the scanning plane (i.e. the set focal plane 29) these portions are only partially covered by the scanning spot 30 resulting in a weaker measuring signal. The spatial divergence of the scanned structures (dendrites 82 and spines 84) from the scanning plane 29 of the scanning trajectory 92 accounts for the lighter and darker vertical lines in the measurement data as represented in FIG. 7.

Figure 8:
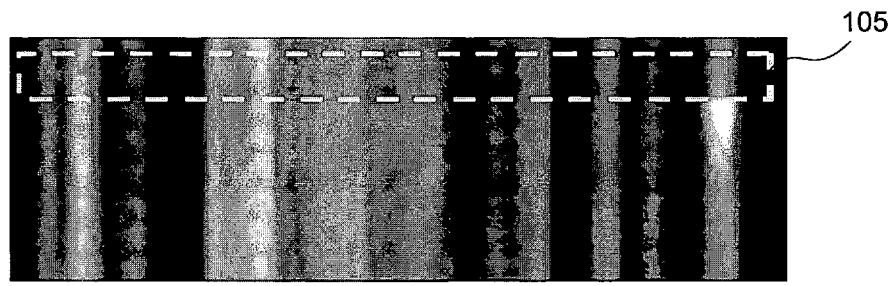
FIG. 8 is a diagram illustrating selecting a set of data for spatially normalising the measurement data presented in FIG. 7.
Figure 9:
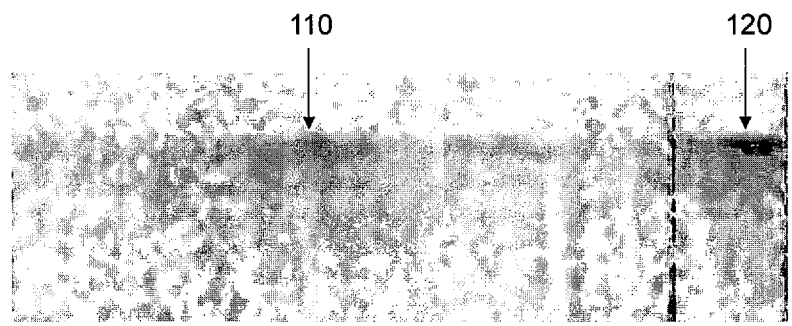
FIG. 9 is a diagram of the spatially normalised measurement data.

In order to compensate for the spatial intensity difference of the measurement data obtained from the effective scanning portion of the focused laser beam 13 (i.e. some parts of the measured structures are illuminated by a larger portion of the effective focus spot 30, while other parts lie more spaced apart from the scanning plane 29 and are thus only illuminated by a smaller portion of the focus spot 30) the measurement data is advantageously normalised by a set of measurement data obtained before applying stimulation to one or more parts of the measured structure. In practice data obtained from the first sequence of measurements 101 may be used to normalise at least the set of data obtained in the second sequence of measurements 102, and preferably all of the obtained measurement data. As explained above the set of measurement data from the first sequence of measurements 101 is represented as the upper rectangular area of the measurement data diagram of FIG. 7. For the sake of better understanding a first set of data 105 belonging to this area has been indicated in FIG. 8. Spatial normalisation may be performed on the whole of the measurement data using the first set of data 105 indicated in FIG. 8 (not necessarily comprising all the sub-sequences of measurements belonging to the first sequence of measurements 101) the resulting spatially normalised measurement data diagram is depicted in FIG. 9. As can be seen, after the spatial normalisation two distinct neural responses 110 and 120 can be distinguished in the measurement data diagram of the present example. The same responses 110 and 120 were present in the original set of measurement data as well, however they were difficult to identify due to the varying effective scanning light intensity.

As is clear for the skilled person the set of measurement data may be converted to any conventional form suitable for describing various aspects of the biological measurement.

Figure 10:
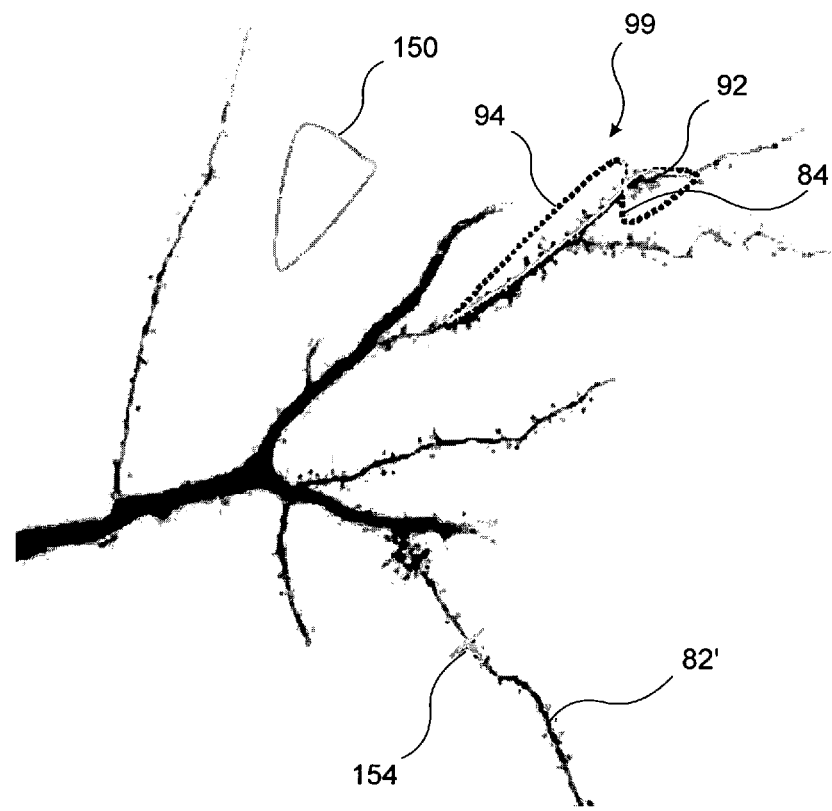
FIG. 10 is an illustration of a background image obtained from another biological specimen, wherein regions of interest, a composite trajectory, a background measurement trajectory and a signal input point is depicted.
Figure 11:
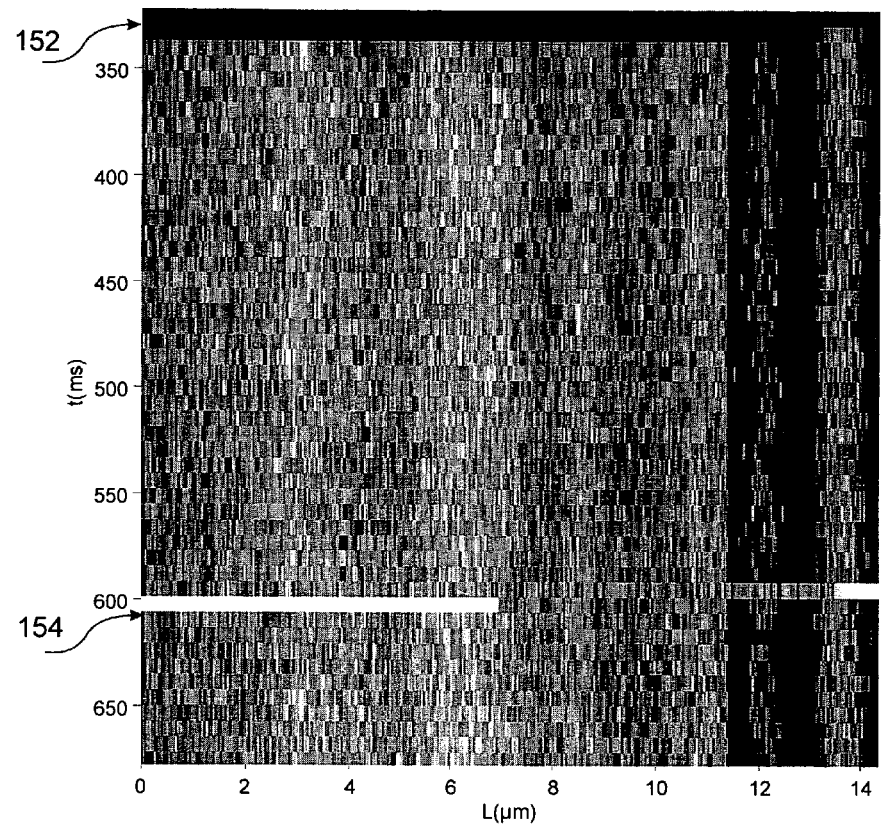
FIG. 11 is a diagram presenting measurement data obtained in measurements performed on the biological specimen illustrated in FIG. 10.
Figure 12:
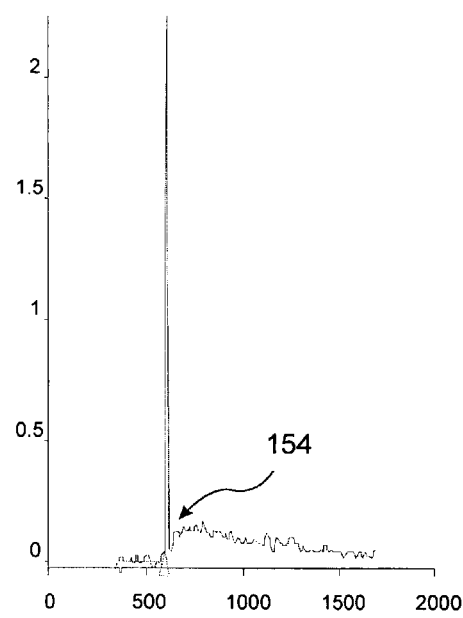
FIG. 12 is a diagram representing the cumulative response function obtained from the measurement data depicted in FIG. 11.

In the example illustrated from FIGS. 10 to 12, a curved dendrite portion 82 and two dendritic spines 84 are measured repeatedly along the indicated scanning trajectories 92. The obtained measurement data is represented in a discrete measurement data diagram in FIG. 11. The horizontal values represent measurement data obtained by the detector 24 while scanning along the composite trajectory 99 comprising the scanning trajectories 92 of the dendrite portion 82 and the spines 84 as well as the cross-over trajectories 94 there between. Lighter shades represent higher measured intensity in the given position of the focus spot 30, while darker shades correspond to segments providing lower signal intensity (e.g. reflected light or back fluoresced light) Time is indicated on the vertical axis, each horizontal row of measuring data (corresponding to the rows of lighter and darker rectangles) is obtained in a single sub-sequence of measurement along the composite trajectory 99. The vertical quasi black regions in the diagram of FIG. 11 correspond to the cross-over trajectories 94 connecting the scanning trajectory 92 of the dendrite portion 82 and the scanning trajectory 92 of the two spines 84.

In this example background light intensity measurement was performed before starting the actual measurements on the regions of interests 86 (i.e. the dendrite portion 82 and the spines 84). The background light intensity was measured along an arbitrary background measuring trajectory 150 located in a neutral region of the biological specimen 22', i.e. a region wherein no labelled neural processes are located. The background light intensity measurement data is represented in the first two (topmost) rows 152 in the diagram. As can be seen these rows 152 appear to be nearly black corresponding to almost no signal. The measured background light intensity is subtracted from the actual measurement data obtained in the following sequence of measurements to correct the detector's offset, dark current and ubiquitous scattered lights.

After performing a first sequence of measurements a signal is provided at a signal input point 154 along the same or a different dendrite portion 82', e.g. the signal being one of the above-described stimulations. The neural response is measured along the scanning trajectories 92 at the other dendrite portion 82. The signal is inputted just before t=600 ms as is well visible from the almost white measuring data represented in the corresponding rows. An average or a summarised cumulative response data may be calculated for each sub-sequence of measurements (i.e. measurements performed along the composite trajectory 99 made up of the scanning trajectories 92 and the cross-over trajectories 94). The resulting cumulative response function is depicted in FIG. 12. The cumulative response function is obtained by averaging or summing the individual signal counts within each row in the diagram of FIG. 11 (corresponding to the discrete measurement data obtained along the composite scanning trajectory 99). The stimulation signal appears as a dirac-delta at approximately t=600 ms. The decay time can also be determined from the cumulative response function.

The invention provides a new and inventive method allowing for a fast and efficient way to perform a sequence of measurements on one or more regions of interest 86, for example the measurements explained in the previous examples. In a first step the method comprises selecting the one or more regions of interest either manually as explained above or automatically, e.g. based on shape recognition of neural processes such as the dendrites 82 and dendritic spines 84. Following this a scanning trajectory 92 is provided for each region of interest 86, e.g. the linear scanning trajectories 92 in FIG. 5 or 10. The sequence of the measurements to be performed may be determined by a user or automatically. This may be done by defining the scanning trajectories 92, which need to be measured in a sub-sequence of measurements and by providing a repetition number for determining the number of times the sub-sequence of measurements must be performed. Optionally other measurement steps may be included after each or a certain number of sub-sequences. Such measurement steps may include stimulation of the measured biological specimen 22' or a pause to allow the neural processes to recover after stimulation. The exact sequence of the measurements and the corresponding scanning trajectories 92 may either be defined by a user or calculated by the measuring system so as to optimise the overall measurement time.

In the same or in a following step the cross-over trajectories 94 are defined or calculated between the scanning trajectories 92 of two consecutive measurements. For example in FIG. 5 a cross-over trajectory 94 is provided between the scanning trajectory 92 for the measurement of spine s2 and the scanning trajectory 92 for the measurement of dendrite portion d2.

The measurements are carried out by deflecting the laser beam 13 via the electro-mechano-optic means 14 in order to move the focus spot 30 of the focused laser beam 14 along the scanning trajectory 92. The focus spot 30 is moved at an average scanning speed. The scanning speed may be constant in which case the average scanning speed corresponds to the scanning speed itself.

After having scanned the scanning trajectory 92 (even if the actual trajectory of the focus spot 30 does not exactly and not always coincide with the scanning trajectory 92) the laser beam 13 is deflected via the electro-mechano-optic means 14 such that the focus spot 30 (or virtual focus spot) of the laser beam 13 is directed along the cross-over trajectory 94 connecting the previously measured scanning trajectory 92 with the subsequent scanning trajectory 92 in the measuring sequence. The focus spot 30 is moved at a cross-over speed having a maximum, the maximum of the cross-over speed being higher than the average scanning speed. The cross-over speed may also be constant, in which case the maximum cross-over speed corresponds to the cross-over speed itself. Due to the mechanical and/or electrical properties of the deflector 14 the actual trajectory of the focus spot 30 may differ substantially from the provided cross-over trajectory 94.

The inventive method allows for decreasing the overall measuring time by moving the focus spot 30 along the cross-over trajectories 94 substantially faster compared to the prior art where the cross-over trajectories 94 are scanned at the same scanning rate as the regions of interest 92.

It is not required that all of the cross-over trajectories 94 be scanned at a cross-over speed having a higher maximum than all or some of the average scanning speeds. For example, the regions of interests 86 may include regions from which only a yes/no type of measurement result is required (e.g. the question being whether or not a response is induced to a stimulation, the numeric value of the response being irrelevant), such regions may be scanned at much higher scanning speeds than the rest of the scanning trajectories 92, and even at scanning speeds equalling or exceeding the average cross-over speed. Also, in the case of 3D laser scanning technologies, a cross-over speed between two spaced apart trajectories requiring major depth focusing may be considerably slower than the scanning speed within a focal layer 29'.

The inventive method may advantageously be carried out with the help of the measuring system 50 according to the invention.

A laser scanning microscope 10 having focusing means (such as the objective 16) for focusing a laser beam 13 and having electro-mechano-optic deflector 14 for deflecting the laser beam 13 is used for performing the actual measurements on the at least one region of interest 86 within the examined sample 22 (e.g. a biological specimen 22', such as neural processes). It should be noted that the laser scanning microscope 10 itself is not necessarily part of the measuring system 50. For example the measuring system 50 may be software application on a computer readable medium.

The measuring system 50 comprises means for selecting at least one region of interest 86 within the sample 22. Such means may comprise a 54 data output interface and a 58 data input interface. For example a physical display (e.g. a monitor) or a graphical display (e.g. graphical interface of a software) may be provided as the 54 data output interface for displaying a background image 80 of the sample 22 to a user, and keyboard, mouse, touch screen or similar devices or a software input interface of such hardware devices may be provided as the 58 data input interface for allowing the user to select regions of interest 86 within the background image 80.

Alternatively, the means for selecting the at least one region of interest 86 may include a software application configured to select regions of interest 86 automatically from a background image 80, e.g. using suitable shape recognition protocols, as are well known in the art.

The measuring system 50 further comprises means for providing a scanning trajectory 92 for the at least one region of interest 86. Such means may include the data input interface 58 for allowing a user to select guide points 90 and a computer program for calculating a scanning trajectory 92 along the selected guide points 90. Alternatively, a software application may serve to define a scanning trajectory 92 within the selected regions of interest 86.

The measuring system 50 further comprises means for providing a sequence of measurements and the corresponding scanning trajectories 92. The data input interface 58 may serve as said means, whereby the user may select the sequence in which the regions of interest 86 (or the scanning trajectories 9) are to be measured. This may serve as a sub-sequence in the total sequence of measurements, in which case the user may provide as additional information the number of times the sub-sequence of measurements is to be performed. Alternatively the means for providing the sequence of measurements may be a software means, which is configured to optimize the composite trajectory 99 (including the scanning trajectories 92 and the cross-over trajectories 94) so as to reduce the overall measuring time.

The measuring system 50 further comprises means for providing cross-over trajectories between the scanning trajectories of two consecutive measurements. Such means may comprise software means for performing any one of the three aspects of the inventive method as will be discussed in more detail later on.

The measuring system 50 further comprises control means 52 being configured to control the electro-mechano-optic means 14 so as to
- deflect the laser beam 13 for moving the focus spot 30 of the focused laser beam 13 along a scanning trajectory 92 at a scanning speed having a maximum; and
- deflect the laser beam 13 for moving the focus spot 30 of the laser beam 13 along a cross-over trajectory 94 at an average cross-over speed having a maximum, the maximum of the cross-over speed being higher than the average scanning speed.

In the following different solutions are presented for determining a cross-over trajectory 94 between two consecutive scanning trajectories 92 and determining the cross-over speed for directing the focus spot 30 of the laser beam from the first scanning trajectory 92 to the second scanning trajectory 92.

Measurement data, as explained above, may or may not be obtained along the cross-over trajectory 94, in any case such data is generally not relevant from the point of view of the actual measurement performed on the selected portions of the neural processes. Accordingly, and in order to speed up the measurement, the focus spot 30 should be directed along the cross-over trajectory 94 as fast as possible. However, the properties of the electro-mechano-optic deflector present certain limitations. Although e.g. deflecting mirrors 14' mounted on galvanometric scanners allow for very fast movement in the XY plane (e.g. distance of about 50-150 µm can be crossed in about 60-100 µs) the XY motion has to be stopped or at least slowed down upon entering the scanning trajectory 92, since the measurements along the scanning trajectories 92 need to be performed at a much lower scanning speed, e.g. about 1-200 µm/ms. The inertia of the deflecting mirrors 14'

Hence, on the one hand and from the point of view of speeding up the measurement the cross-over time should be minimised, i.e. the time spent along the cross-over trajectory 94. This can be achieved by increasing the cross-over speed, which is only limited by the scanning motor performance. On the other hand however, due to the mechanical and/or electric properties of the electro-mechano-optic deflector 14 if the motion of the deflecting mirrors 14' needs to be slowed down drastically at the end of the cross-over trajectory 94 in order to obtain the required scanning speed, then the abrupt deacceleration results in transient oscillations (vibrations) of the electro-mechano-optic deflector 14. For example this can be due to the inertia of moving components within the deflector or transient oscillations of capacitive components in the electric circuit of the deflector.

FIG. 13 shows two consecutive scanning trajectories 92 lying in the XY plane and a cross-over trajectory 94 connecting the end point 93 of the first scanning trajectory 92 and the starting point 91 of the second scanning trajectory 92. In practice the effect of the transient oscillations of the mechanical components of the electro-mechano-optic deflector 14 is that it will not be possible to precisely trace the second scanning trajectory 92 with the scanning focus spot 30 right from the starting point 91 of the second scanning trajectory 92, instead the scanning trajectory 92 will have a transient portion 92a along which the focus spot 30 oscillates. Thus the actual trajectory 95 of the focus spot diverges from the scanning trajectory 92 (and cross-over trajectory 94) as is clear from the schematic representation of the actual trajectory 95 depicted below the theoretical scanning trajectories 92 and 94.

In a first aspect of the invention this problem is overcome by determining a transient data portion corresponding to the transient portion 92a of the scanning trajectory 92 along which transient oscillations of the electro-mechano-optic means 14 are above a critical value; and discarding, marking or hiding the transient data portion. In this case the scanning trajectory 92 is preferably set to extend beyond the region of interest 86 (see FIG. 5) thereby the discarded, marked or hidden transient data corresponds to a portion of the scanning trajectory 92 which is not of interest and the measurement data of which does not contribute to the actual measurement. The critical value of the transient oscillations (generally expressed in terms of amplitude) depends on the type of measurements to be performed. For certain measurements precise tracing of the scanning trajectory 92 is required, for others it might be sufficient to roughly follow the scanning trajectory 92.

In a second aspect of the invention the above problem is overcome by estimating and providing a transient portion 92a for each scanning trajectory 92 in advance. The transient portions 92a are chosen such as to allow for transient oscillations of the electro-mechano-optic means to drop below a critical value along the transient portion 92a. Because the transient portion 92a is determined in advance, it is possible to start the actual measurement along the measuring portion 92b of the scanning trajectory 92, following the transient portion 92a as indicated in FIG. 13. Thereby, no transient data portion needs to be calculated and discarded, marked or hidden after the measurement. The transient portion 92a is preferably provided outside of the region of interest 86 (see FIG. 5) thereby the relevant measuring portion 92b of the scanning trajectory 92 (i.e. the rest of the scanning trajectory 92) covers the whole of the region of interest 86 from which measurement data is required.

The scanning trajectories 92 and cross-over trajectories 94 shown in FIG. 5 represent the implementation of the above technique. A transient portion 92a is provided for each scanning trajectory 92 along which the XY motion of the scanning focus spot 30 can be slowed down (resulting in transient oscillations of the scanning mirrors 14'). Accordingly, the focus spot 30 can be directed along the cross-over trajectory 94 at a higher average cross-over speed, then slowed down along transient portion 92a to a lower scanning speed suitable for scanning along the measuring portion 92b of the scanning trajectory 92. The scanning speed may vary along the measuring portion 92b of the scanning trajectory as well, e.g. the motion of the scanning mirrors 14' may need to be slowed further down to be able to trace relatively sharp bends of the scanning trajectory 92.

By applying either one of the above described technologies the average cross-over speed may be substantially greater than the average scanning speed along the scanning trajectory 92 as well as the maximum of the cross-over speed being greater than the maximum of the scanning speed. Thereby the total measuring time can be decreased without compromising the measurements along the important portions of the scanning trajectories, i.e. the portions falling within the selected regions of interest 86.

Furthermore, by providing sufficiently long transient portions 92a the cross-over speed may be increased along the whole of the cross-over trajectory 94, the only limitation being the performance of the scanning motor, while assuring that the transient oscillations of the electro-mechano-optic deflector 14 does not disturb the measurement along the actual measuring portions 92b of the scanning trajectories 92.

The cross-over speed may also be determined automatically by a servo drive of the scanning motors.

It should be noted that although the scanning trajectories 92 depicted in FIG. 5 comprise transient portions 92a at both the starting point 91 of the scanning trajectory 92 and at the end point 93 of the scanning trajectory 92, it might be sufficient to provide a transient portion 92a at the starting point of the scanning trajectory 92 as illustrated in FIG. 13.

In order to estimate the necessary length of the transient portions 92a the inventive method preferably allows for back measuring.

The method comprises measuring a background image 80 of the specimen 22 such as the ones depicted in FIGS. 5 and 10. As explained above at least one region of interest is selected on the background image 80 by the user or by the measuring system 50 (e.g. via a shape recognition software running on the measuring system 50) or by an external software or device. The measurement particulars may also be provided by the user via the user data input interface 58, or they can be pre-given settings and instructions to be carried out by the measuring system 50. The measurement particulars may include particulars relating to scanning speed of all, some or a specific scanning trajectory 92, cross-over speed of all, some or a specific cross-over trajectory 94, overall scanning time, length and shape of the scanning trajectories 92, length and shape of the transient portions 92a, definition of the regions of interest 86, etc. A first sequence of measurements is performed to obtain calibration data. During this first sequence of measurement time dependent position data of the deflector 14 is obtained (e.g. using known position feed-back devices) and the position of the focus spot 30 of the laser beam 13 is measured back to the XY scanning plane (i.e. the focus plane 29). The measured back position of the focus spot 30 of the laser beam 13 may be displayed against the background image 80 via the information presentation means 56, thus allowing the user to verify whether or not sufficient transient portion 92a has been provided for the transient oscillations to decay. If the amplitude of the remaining oscillation is found to be above a critical value even within the measuring portion 92b of the scanning trajectory, some or all of the scanning trajectories 92 and/or the measurement particulars (such as the scanning speed and cross-over speed) may be redefined in view of the back measurement either by the user or by a software comprise by the measuring system 50.

The above described back-measurement technology may be used in combination with the first aspect of the invention as well.

In a third aspect of the invention the above problem is overcome by controlling the cross-over speed via the scanning motors of the deflector 14. This solution is particularly well suited for application with scanning motors having an analogue servo drive.

The method according to the third aspect of the invention is carried out in the following way.

A cross-over trajectory 94 is provided (e.g. calculated by the measuring system 50) between an end point 93 of a first scanning trajectory 92 and a starting point 91 of a second scanning trajectory 92. Furthermore, a cross-over speed is calculated for moving the focus spot 30 along the cross-over trajectory 30. The calculated cross-over speed is such as to have a maximum which is higher than the maximum of the scanning speed along at least the second scanning trajectory 92. Furthermore the cross-over speed is substantially the same at the end of the cross-over trajectory 94 as the scanning speed at the starting point 91 of the second scanning trajectory 92 to minimise the need of rapid deacceleration at the starting point 91 of the second scanning trajectory 92. Furthermore, the cross-over speed is defined such as to be performable by the deflector without resulting in transient oscillations of the electro-mechano-optic means exceeding a given amplitude and/or a given decay time.

This may be achieved for example in the following way. While moving the focus spot 30 of the laser beam 13 along the cross-over trajectory 94 between two consecutive scanning trajectories 92 of two consecutive measurements first the cross-over speed is substantially increased—starting from the scanning speed at the end point 93 of the first scanning trajectory 92—along a first cross-over portion; then the cross-over speed is substantially decreased along a second cross-over portion such that the cross-over speed at the end of the cross-over trajectory 94 is substantially the same as the required scanning speed at the starting point 91 of the second scanning trajectory 92.

An exemplary composite trajectory 99 comprising a first and a second scanning trajectory 92 and a cross-over trajectory 94 connecting the end point 93 of the first scanning trajectory 92 and the starting point 91 of the second scanning trajectory 92 is illustrated in FIG. 14. The composite trajectory 99 lies in an XY plane, the end point 93 of the first scanning trajectory 92 has coordinates (x1, y1), while the starting point 91 of the second scanning trajectory 92 has coordinates (x2, y2). As can be seen the composite trajectory 99 made up of the two scanning trajectories 92 and the cross-over trajectory 94 is formed as a single smooth line without any sharp turns or bends to allow for continuous motion of the scanning mirrors 14' without any sudden changes in the motion of either of the two scanning mirrors.

The time dependent x(t) position and y(t) position of the focus spot 30 along the composite trajectory 99 is shown in FIGS. 15 and 16. The illustrated x(t) and y(t) functions are each smooth functions in accordance with the requirement that preferably neither the scanning mirror 14' allowing for deflection in the X direction, nor the scanning mirror 14' allowing for deflection in the Y direction should be set in motion or made to stop abruptly.

The X and Y components of the speed of the focus spot 30 along the illustrated composite trajectory 99 is given by functions Vx(t) and Vy(t) shown in FIGS. 17 and 18 respectively. The first scanning trajectory 92 is scanned at V1 speed, while the second scanning trajectory 92 is scanned at V2 speed. V1 and V2 scanning speeds may vary along the scanning trajectories 92 as explained earlier, however for the sake of better understanding the values are constant in the present example. Furthermore, to help better understanding of the inventive method the exemplary scanning trajectories 92 are straight lines, thus the X and Y components of the V1 and V2 scanning speeds are constant too.

As can be seen in FIG. 17 the X component of the cross-over speed is continuously increased from the V1 scanning speed along a first portion of the cross-over trajectory 94 until turning point T ($x_T$; $y_T$), from which on Vx(t) is continuously decreased along a second portion of the cross-over trajectory 94 to obtain the required scanning speed V2 when arriving at the starting point 91 of the second scanning trajectory 92.

The situation is somewhat different in the case of the Y direction motion. The focus spot 30 is moving along the Y axis in a first direction (in the direction of the negative values as depicted in FIG. 14) while scanning along the first scanning trajectory 92, while it must eventually be moved in the opposite direction (towards increasing Y coordinates) along the cross-over trajectory 94 in order to reach the starting point 91 of the second scanning trajectory 92. The motion of the Y deflecting mirror 14' needs to be stopped two times along the illustrated smooth cross-over trajectory: the motion of the Y deflecting mirror 14' is first stopped (reaching a minimal Y position value), then it is set in motion with increasing angular speed in the opposite sense, then slowed down and brought to a halt (reaching a minimal Y position value), after which the angular speed is increased again but in the first sense, so as to obtain the required V2y scanning speed upon arrival at the starting point 91 of the second scanning trajectory 92. Nevertheless the maximum cross-over speed (meaning both the X and Y components) and even the average cross-over speed is substantially higher in this example than either one of the two scanning speeds. Furthermore, because both the x(t) and the y(t) position functions of the focus spot 30 are smooth functions, any transient oscillations at the starting point 91 of the second scanning trajectory 92 can be kept at a minimum. It should be noted that the first scanning trajectory 92 and the cross-over trajectory 94 may be fitted together in a less smooth way as well, since transient oscillations along the cross-over trajectory 94 generally do not bear with any significance as regards the actual measurements of the regions of interest 86. Moreover, the scanning laser beam 13 may be shut-off while moving along the cross-over trajectory 94.

In the exemplary embodiment illustrated in FIGS. 14 to 17 the cross-over trajectory 94 is made up of double parabolic curves in the X(t) space and in the Y(t) space. The two parabolic curves are fitted to each other at the indicated Tx and Ty points in the X(t) and in the Y(t) space respectively. The maximum of the Vx and Vy speed components is also reached in Tx and Ty points respectively. It should be noted that Tx and Ty points do not necessarily belong to the same t time, and the T ($x_T$; $y_T$) point along the cross-over trajectory 94 where the V crossover speed reaches its maximum may well be distinct from both Tx and Ty points.

The underlying concept of both the X and Y direction speed control and cross-over trajectory planning is to provide a cross-over trajectory 92 and Vx(t) and Vy(t) cross-over speed functions which allow for decreasing the time spent between the first and second scanning trajectories 92 by having a higher maximum than the scanning speed maximum along the scanning trajectories 92. The higher cross-over speed maximum generally implies higher average cross-over speed as well. Furthermore, by defining an appropriate cross-over trajectory 94 and Vx and Vy cross-over speed functions, the inventive method also allows for performing the measurements along the scanning trajectories 92 with tolerable transient oscillations. In the present context tolerable means that the transient oscillations do not exceed a given amplitude and/or given decay time. The maximum tolerable amplitude and/or decay time of any transient oscillations depends on the type of measurement to be performed. As explained above, in the case of simple yes/no measurements even higher divergence from the scanning trajectory 92 may be permissible.

The back measuring technique explained in connection with the second aspect of the invention is applicable in connection with the present aspect of the invention as well, i.e. in connection with determining a satisfying cross-over trajectory 94 and corresponding cross-over speed, which on the one hand allow for decreasing the overall measuring time and on the other hand provide for satisfactory measuring quality over the scanning trajectories 92 and more particularly over the regions of interest 86.

Preferably the method according to the invention includes obtaining a background image 80 of the specimen 22 in the scanned XY plane; selecting at least one region of interest 86 on the background image 80, by selecting discrete guide points 90; and interpolating the scanning trajectory 92 over the region of interest 86 based on the discrete guide points 90.

Preferably the interpolation algorithm takes into account the physical properties of the scanner motor of the electro-mechano-optic deflector 14 as well as the provided measurement particulars, in order not to exceed the maximum speed and maximum acceleration of each scanner motor.

In order not to exceed the maximum speed and acceleration of the scanner motors the cross-over trajectory 92 may be defined by such x(t) and y(t) functions which are limited in the first and second derivates:

$$c > f(x', x'', y', y'')$$

c being a constant, x', y' and x'', y'' denoting the first and second derivatives respectively. For example $$c_x \geq x' \text{ and } c_y \geq y' \text{ and } c_{x2} \geq x'' \text{ and } c_{y2} \geq y''$$

$C_x$, $C_y$, $C_{x2}$, $C_{y2}$ being constants.

The back measurement technique described above in connection with the three cross-over strategies according to the three preferred aspects of the invention can be used in an another advantageous way. It may also be used to correct any positioning error of the focal point along the scanning trajectory 92. At very high scanning speeds the deflector 14 is no longer able to trace the scanning trajectory 92 precisely, thus the actual trajectory 95 may even be offset from the measuring portion 92b of the scanning trajectory 92 by a small but significant error. Since this error has been found to be relatively stable over the repetitive scanning cycles along the composite trajectory 99, the actual trajectory 95 may be visualized by the back measurement technique and the error may be corrected by the user by means of offsetting the measurement particulars in the same amount, or the correction may be automated using known convergence algorithms.

The method according to the invention preferably comprises the steps of:
  obtaining a background image of the sample;
  defining the at least one region of interest on the background image;
  obtaining the measured back position of the focus spot of the laser beam or the time dependent position data of the deflecting means on the background image of the sample searching for the "stabile" trajectories of the scanning which are characterized by a "spatiotemporal" accuracy limit as a function of repetition number of the trajectory calculating an error function obtained from the difference between the stabile trajectory and the originally defined trajectory reducing this error function under a certain accuracy limit by changing the position signal of the deflecting means in one or more steps;

optionally showing the result on the background image.

This manual or automatic process is done at the beginning of the measurement.

The error function is reduced by an iterative convergence algorithm comprising:

calculating the difference in every point between the stabile trajectory and the originally obtained actual trajectory;

adding an additional compensatory signal to the previous position signal of the deflecting means using a given convergence algorithm (the calculus of compensatory signal is based on the difference between the stabile trajectory and the originally obtained trajectory);

obtaining the newly measured back position of the focus spot of the laser beam or the time dependent position data of the deflecting means and obtaining the new stabile trajectory;

returning to the first step or stop the iteration if the error is smaller then a given accuracy limit;

optionally showing the result on the background image.

Alternatively, the user may manually correct the stabile trajectory in one or more steps changing the curve while visualising the newly obtained position data on the background image in order to approximate the originally planned trajectory.

It is to be appreciated that either one of the first two aspects of the invention may be combined with the third one and with each other as well. In particular one or more of the scanning trajectories 92 may extend outside of the regions of interest 86 and transient measurement data occurring in spite of the optimised cross-over speed function may simply be discarded (or marked or hidden) without compromising the measurement within the regions of interest 86. Alternatively one or more of the scanning trajectories 92 may be provided with a transient portion 92a extending outside of the regions of interest 86, the length of the transient portion 92a being estimated to allow for transient oscillations of the electro-mechano-optic means 14 occurring in spite of the optimised cross-over speed function to dye away.

The inventive method allows for carrying out measurements and optimising the scanning trajectories 92 and cross-over trajectories 94 in 3D as well.

When scanning regions of interest 86 in 3D use can be made of the above mentioned approx. 6-7 μm effective diameter of the focus spot 30 as was explained in connection with FIGS. 2 and 3.

Figure 19:
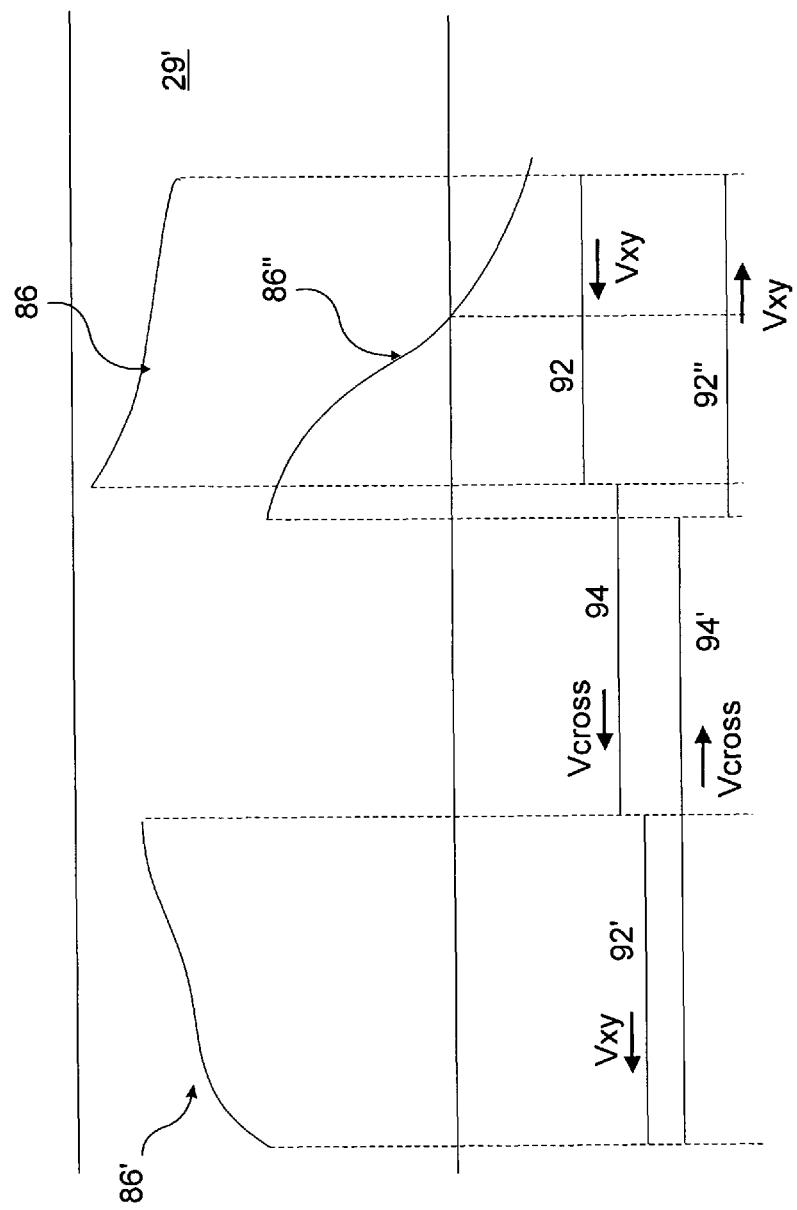
FIG. 19 is a schematic projected side view of a part of a biological specimen illustrating how the inventive scanning method may be performed in 3D using a 3D laser scanning microscope having acousto-optic deflectors for changing the position of the focal plane relative to the sample.
Figure 20:
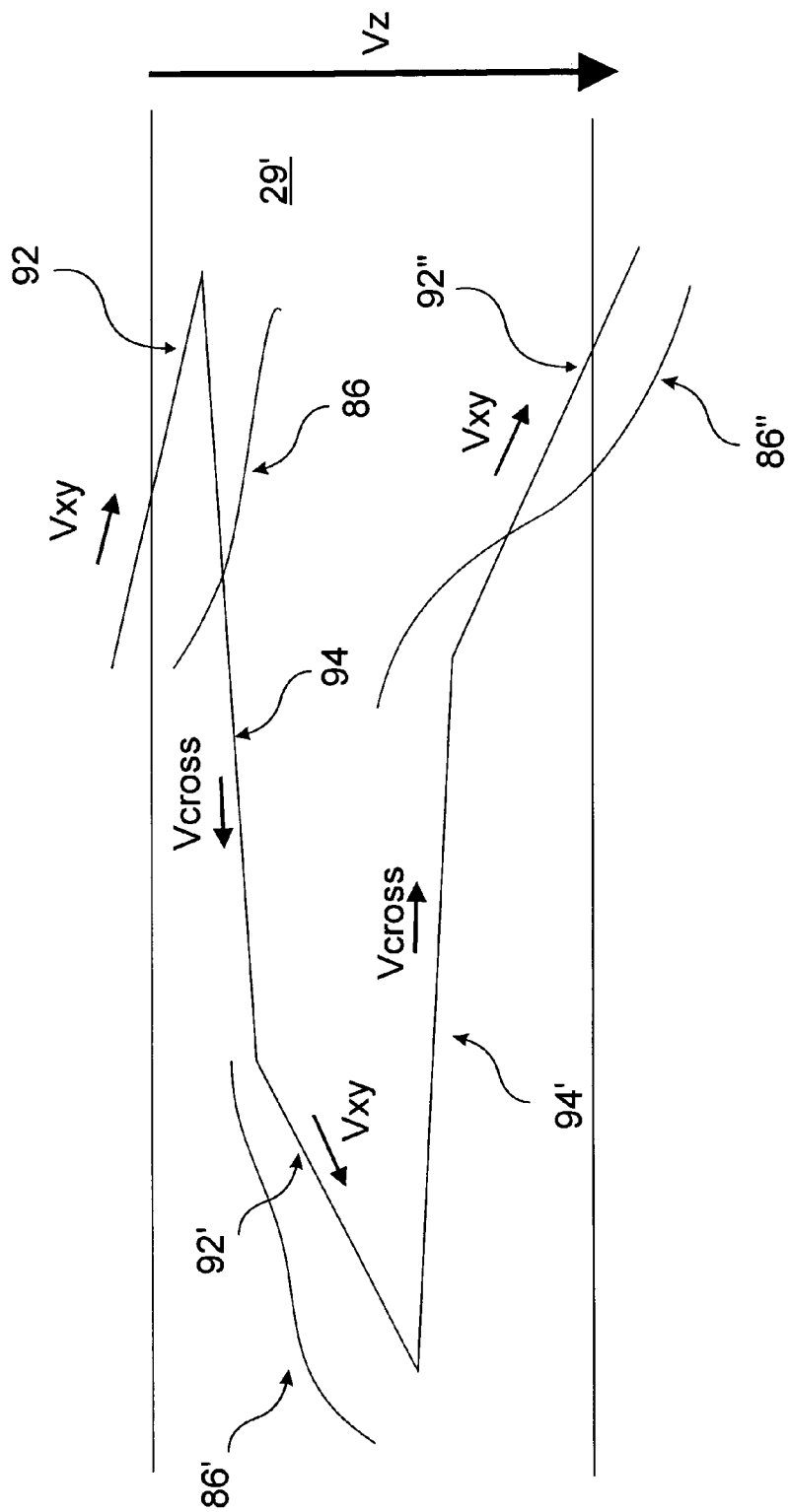
FIG. 20 is a schematic projected side view of a part of a biological specimen diagram illustrating how the inventive scanning method may be performed in 3D using a 3D laser scanning microscope having a drive means for oscillating an objective in order to change the position of the focal plane relative to the sample.

3D regions of interest 86 lying at least partly within the same focal layer 29' may be scanned with the above explained scanning techniques according to the invention. FIG. 19 and FIG. 20 illustrate embodiments of the inventive method, wherein a first, a second, and a third region of interest 86, 86' and 86" lie substantially within the same focal layer 29'.

The inventive method and measuring system 50 is applicable with any 3D laser scanning microscope which allows for random 3D scanning. For example the 3D laser scanning microscope 10 illustrated in FIG. 1 has focusing means comprising an objective 16 and drive means 18 (e.g. a piezo positioner 18') for displacing the objective 16 along the optical axis (Z direction) of the objective 16. The focusing means thus allows for moving the focus spot 30 of the laser beam 13 along the optical axis, and thereby allows for performing random 3D scanning.

Instead of the drive means 18 illustrated in FIG. 1 the 3D laser scanning microscope 10 may be provided by acousto-optic focusing means (e.g. a pair of acousto-optic deflectors as known in the art).

The application of the inventive method in 3D is illustrated in FIGS. 19 and 20 schematically depicting a side view of the measured sample 22 (neural processes). In the illustrated examples a first, a second and a third region of interest 86, 86' and 86" is selected e.g. by the user as explained above (providing guide points 90 for defining the region of interest 86).

If the 3D laser scanning microscope 10 is provided with piezoelectric device for changing the focusing means, then the laser beam 13 may be focused to any XY plane, and changing of the focal plane 29 requires e.g. about 20-30 μs. When applying the inventive method the focal plane 29 is preferably set so as to include as many regions of interest 86, 86', 86" in the corresponding focus layer 29' as possible. As explained above 3D regions of interest 86, 86', 86" within a single focal layer 29' may be regarded as planar objects since by moving the focus spot 30 in the focal plane 29 the whole of the focal layer 29' can be swept. Accordingly, in this embodiment first, second and third scanning trajectories 92, 92', 92" may be provided in the focal plane 29 for scanning each region of interest 86, 86', 86"; and cross-over trajectories 94 and 94' provided between the first and second scanning trajectories 92, 92' and between the second and third scanning trajectories 92, 92" may also be provided in the focal plane 29. For the sake of clarity the scanning trajectories 92, 92', 92" and the cross-over trajectories 94, 94' are depicted below the illustration of the focal layer 29' in an exploded view (shifted relative to each other). It is to be understood that the composite trajectory 99 (i.e. the scanning trajectories 92, 92', 92" and the cross-over trajectories 94, 94' in the order of the measuring sequence) may be obtained by projecting the separately illustrated trajectories 92, 92', 92", 94, 94' back onto the focal plane 29.

As has been explained above, the scanning trajectories 92, 92', 92" may lie outside of the regions of interest 86, 86', 86" yet still allow for scanning of the regions of interest 86, 86', 86". Here all the scanning trajectories 92, 92', 92" lie within the focal plane 29, while the regions of interest are 3D curves located mostly within the focal layer 29'.

The inventive method may be carried out in any of the above-explained ways to scan the regions of interest 86, 86', 86" falling substantially within a single focal layer 29', since all such regions of interest 86, 86', 86" may be scanned along the scanning trajectories 92, 92', 92" provided in the focal layer 29 without having to change the focal depth of the microscope 10 via the focusing means.

As can be seen in FIG. 19 the end portion of the third region of interest 86" lies outside of the focal layer 29'. Thus either this region is excluded from the measurement or the focal plane 29 of the microscope needs to be changed via the focusing means, to cover the end portion of the third region of interest 86" as well. Preferably the measurement may be performed layer by layer, thus scanning regions of interests 86 within the whole of the specimen 22'. Scanning trajectories 92 reaching from one layer to another may be regarded as two separate scanning trajectories 92, which may be scanned separately in the sequence of measurements.

Naturally the same considerations are applicable to other types of random access 3D laser scanning microscopes as well, such as the 3D laser scanning microscope 10 illustrated in FIG. 1, wherein depth focusing is performed by displacing the objective 16 via appropriate drive means 18 such as a piezo positioner 18'. Thus it is possible to set the focal plane 29 of the microscope optics to the desired height within the sample to be examined and perform all the measurements on the regions of interest 86 falling within the corresponding focal layer 29, and then set the focal plane 29 to a new desired height.

However, this might not be the most preferred way of performing the sequence of measurements, especially if the focal plane 29 needs to be changed often.

The galvanometric scanners and other electro-mechano-optic deflector 14 are very fast devices, hence moving the focus spot 30 to a desired XY plane position and obtaining measurement data via the detector 24 or exciting the specimen in the given XY position can be carried out in less than 1 ms. However, due to the inertia of the microscope objective 16 and the detector 24 the depth scanning (Z positioning) takes substantially more time, rendering the 3D scanning a lengthy operation.

In "Imaging cellular network dynamics in three dimensions using fast 3D laser scanning" (Nature Methods, Vol. 4 No. 1, January 2007) Göbel et al. propose to drive a piezo-positioner of a laser scanning microscope objective with a sinusoidal signal and calculate an appropriate drive signal for the X-Y scanners (galvanometric scan mirrors) to obtain a desired 3D trajectory. The article discusses measurements made at a sinusoidal drive signal of 10 Hz and suggests adjustment of the drive signal to compensate for amplitude reduction and phase shift of the actual objective position with respect to the drive signal of the piezo-positioner.

In Hungarian patent application No. P 08 00433, a method is suggested for compensating for the deviation from sinusoidal movement of a focusing optics in response to a high-frequency sinusoidal drive signal.

If the regions of interest 86 lie in a plurality of focal layers 29' it is proposed to apply the above referenced technologies for changing the focus position of the focal spot 30 in the Z direction. Accordingly, the focal spot 30 oscillates along the Z axis and the inventive method is applied for changing the XY position of the oscillating focus spot 30 in order to scan regions of interest 86 as illustrated in FIG. 20. Although the objective 16 is preferably oscillated by a sinusoidal or close-to-sinusoidal drive signal producing varying speed along the optical axis Z—in order to render the example more comprehensible—it is assumed that the Vz scanning speed in the Z direction is constant within a single focal layer 29'. Moreover, assuming a constant Vxy scanning speed along all the scanning trajectories 92, 92', 92" and constant Vcr cross-over speed along all the cross-over trajectories 94, 94', the trajectory of the focus spot 30 projected onto a plane perpendicular to the XY plane (e.g. the XZ plane) is made up of straight slopes.

The first, second and third scanning trajectories 92, 92', 92" are provided such as to allow for performing the desired measurements on the regions of interest 86, 86', 86", however, the scanning trajectories 92, 92', 92" do not coincide with the regions of interest 86, 86', 86" because the Z direction motion of the focus spot 30 presents an extra constraint.

The method according to the present invention is implemented by controlling the XY component of the scanning speed and the cross-over speed in a way so as to allow for carrying out the measurements along the scanning trajectories 92, 92', 92" (and thereby along the selected regions of interest 86, 86', 86") and to allow for directing the focus spot 30 of the laser beam 13 to the subsequent scanning trajectory 92 or 92' or 92" at a substantially higher average cross-over speed then the scanning speed.

The scanning technique illustrated in FIG. 20 differs from the scanning technique presented in FIG. 20 mainly in that the focus spot 30 has a constant Vz speed along the optical axis Z, thereby the focus spot 30 will eventually leave the depicted focal layer 29' (more precisely, it is the focal layer 29' that is shifted within the sample 22 together with the focus spot 30). Therefore, if the cumulative length of all the scanning trajectories 92, 92', 92" within the depicted focal layer 29' is too long to be scanned before the focus spot 30 is drawn away, the scanning of some of the scanning trajectories 92 may be left to subsequent periods (or half-periods) of the oscillation when the focus spot 30 returns and can trace the remaining regions of interest 86.

If the oscillation frequency is high causing deviation from the periodical drive signal of the objective drive means, then a skilled person will be able to adapt the solution proposed in Hungarian patent application No. P 08 00433 the content of which is fully incorporated herein by reference.

The above-described embodiments are intended only as illustrating examples and are not to be considered as limiting the invention. Various modifications will be apparent to a person skilled in the art without departing from the scope of protection determined by the attached claims.

The invention claimed is:

1. Method for carrying out measurements on at least one region of interest within a sample via a laser scanning microscope having focusing means for focusing a laser beam and having electro-mechano-optic deflector for deflecting the laser beam, the method comprising:

providing a scanning trajectory for the at least one region of interest, the scanning trajectory comprising a measuring portion and a transient portion;

providing a sequence of measurements and corresponding sequence of scanning trajectories;

providing cross-over trajectories between scanning trajectories of two consecutive measurements;

deflecting the laser beam via the electro-mechano-optic deflector for moving a focus spot of the focused laser beam along a first scanning trajectory in the measurement sequence at a first average scanning speed; and deflecting the laser beam via the electro-mechano-optic deflector for moving the focus spot of the laser beam along a cross-over trajectory connecting the first scanning trajectory and a subsequent second scanning trajectory in the measurement sequence at a cross-over speed, the average cross-over speed being higher than the first average scanning speed;

deflecting the laser beam via the electro-mechano-optic deflector for moving a focus spot of the focused laser beam along a the second scanning trajectory in the measurement sequence at a second average scanning speed, which is lower than the average cross-over speed;

determining a transient data portion corresponding to the transient portion of the second scanning trajectory along which transient oscillations of the electro-mechano-optic means are above a critical amplitude; and collecting measurement data from the second scanning trajectory only after the transient data portion.

2. The method according to claim 1, comprising measuring background light intensity, preferably in the proximity of one or more regions of interest;

performing a sequence of measurements and obtaining a set of measurement data;

correcting the set of measurement data with one or more measured background light intensity.

3. The method according to claim 1, comprising
performing a first sequence of measurements and obtaining a first set of data;
performing a second sequence of measurements and obtaining a second set of data; and
spatially normalizing the second set of data with the first set of data.

4. The method according to claim 3, wherein the second sequence of measurements includes directing the deflector onto the same or other pre-selected trajectories to perform activation of photo-sensitive molecules, such as photo-stimulation, uncaging, or, FRAP experiments, or includes chemical, electrical, electro-chemical or photo-chemical stimulation.

5. The method according to claim 1, comprising
obtaining a background image of the sample and the at least one region of interest selected on the background image;
providing measurement particulars;
performing a first sequence of measurements;
obtaining time dependent position data of the deflector or measuring back the position of the focus spot of the laser beam in an XY plane;
indicating the back measured position of the focus spot of the laser beam or the time dependent position data of the deflector on the background image of the sample;
allowing for redefining the measurement particulars in view of the back measurement.

6. The method according to claim 1 comprising
obtaining a background image of the sample;
defining the at least one region of interest on the background image;
obtaining a measured back position of the focus spot of the laser beam or a time dependent position data of the deflector on the background image of the sample;
searching for stable trajectories of the scanning which are characterized by an accuracy limit which is a function of number of repetitions of the trajectory
calculating an error function obtained from the difference between the stable trajectory and the originally defined trajectory
reducing this error function under a certain accuracy limit by changing the position signal of the deflector in one or more steps;
optionally showing the result on the background image.

7. The method according to claim 1, comprising
obtaining a background image of the sample;
selecting the at least one region of interest on the background image, by selecting discrete guide points; and
interpolating a scanning trajectory over the region of interest based on the discrete guide points.

8. The method according to claim 7, comprising
taking the physical properties of the scanner motor of the electro-mechano-optic deflector and the provided measurement particulars into account in the interpolation algorithm, in order not to exceed the maximum speed and maximum acceleration of the scanner motor.

9. The method according to claim 1, wherein the microscope comprises focusing means for moving the focus spot of the laser beam along optical axis of the focusing means which comprises an optical element and drive means for displacing the optical element or an acousto-optic deflector.

10. Measuring system for carrying out measurements on at least one region of interest within a sample via a laser scanning microscope having focusing means for focusing a laser beam and having electro-mechano-optic deflector for deflecting the laser beam, the system comprising:
means configured to select at least one region of interest within the sample;
means configured to select a scanning trajectory comprising a measuring portion and a transient portion for the at least one region of interest;
means configured to select a sequence of measurements and the corresponding scanning trajectories;
means configured to provide cross-over trajectories between the scanning trajectories of two consecutive measurements; and
control means configured to control the electro-mechano-optic deflector so as to
deflect the laser beam for moving a focus spot of the focused laser beam along a first scanning trajectory at an average scanning speed;
deflect the laser beam for moving the focus spot of the laser beam along a cross-over trajectory connecting the first scanning trajectory and a subsequent second scanning trajectory in the measurement sequence at a cross-over speed, the average cross-over speed being higher than the average scanning speed;
deflect the laser beam via the electro-mechano-optic deflector for moving a focus spot of the focused laser beam along a the second scanning trajectory in the measurement sequence at a second average scanning speed, which is lower than the average cross-over speed; and
means configured to detect a transient data portion corresponding to the transient portion of the second scanning trajectory along which transient oscillations of the electro-mechano-optic means are above a critical amplitude; and to collect measurement data from the second scanning trajectory only after the transient data portion.

11. The measuring system according to claim 10, comprising
data output interface for outputting measurement data and
data input interface allowing for selecting at least one region of interest within the sample and allowing a user to specify measurement particulars and at least one region of interest.

* * * * *